United States Patent [19]

McCreery et al.

[11] Patent Number: 5,787,253

[45] Date of Patent: Jul. 28, 1998

[54] APPARATUS AND METHOD OF ANALYZING INTERNET ACTIVITY

[75] Inventors: Timothy David McCreery, Lafayette; Mahboud Zabetian, Walnut Creek, both of Calif.

[73] Assignee: The AG Group, Walnut Creek, Calif.

[21] Appl. No.: 654,347

[22] Filed: May 28, 1996

[51] Int. Cl.$^6$ .................................................. H04N 1/413
[52] U.S. Cl. ...................... 395/200.61; 395/200.32; 395/200.77; 370/351; 370/379; 370/389
[58] Field of Search .................... 395/200.11, 200.32, 395/200.61, 200.68, 200.75, 200.77; 370/354, 355, 245, 351, 379, 389, 392

[56] References Cited

U.S. PATENT DOCUMENTS

| | | | |
|---|---|---|---|
| 5,247,517 | 9/1993 | Ross et al. | 370/452 |
| 5,315,580 | 5/1994 | Phaal | 370/232 |
| 5,627,886 | 5/1997 | Bowman | 379/111 |

*Primary Examiner*—Thomas Peeso
*Attorney, Agent, or Firm*—Fenwick & West LLP

[57] ABSTRACT

An internet activity analyzer includes a network interface controller, a packet capturing module, a packet analysis module, and a data management module. The network interface controller is connected to a transmission medium for a network segment and is arranged to receive the stream of data packets passing along the medium. The packet stream is filtered to remove undesired packet data and is stored in a raw packet data buffer. The packet data is decoded at the internet protocol layer to provide information such as timing and sequencing data regarding the exchange of packets between nodes and the packet data for exchanges between multiple nodes may be recompiled into concatenated raw transaction data which may be coherently stored in a raw transaction data buffer. An application level protocol translator translates the raw transaction data and stores the data in a translated transaction data buffer. The translated data provides high level information regarding the transactions between nodes which is used to monitor or compile statistics regarding network or internetwork activity. The data management module communicates with the packet capturing module and the packet analyzer and, particularly, the data in the raw packet, decoded packet, raw transaction, and translated transaction data buffers to provide real time and stored analytical information concerning internet activity.

23 Claims, 12 Drawing Sheets

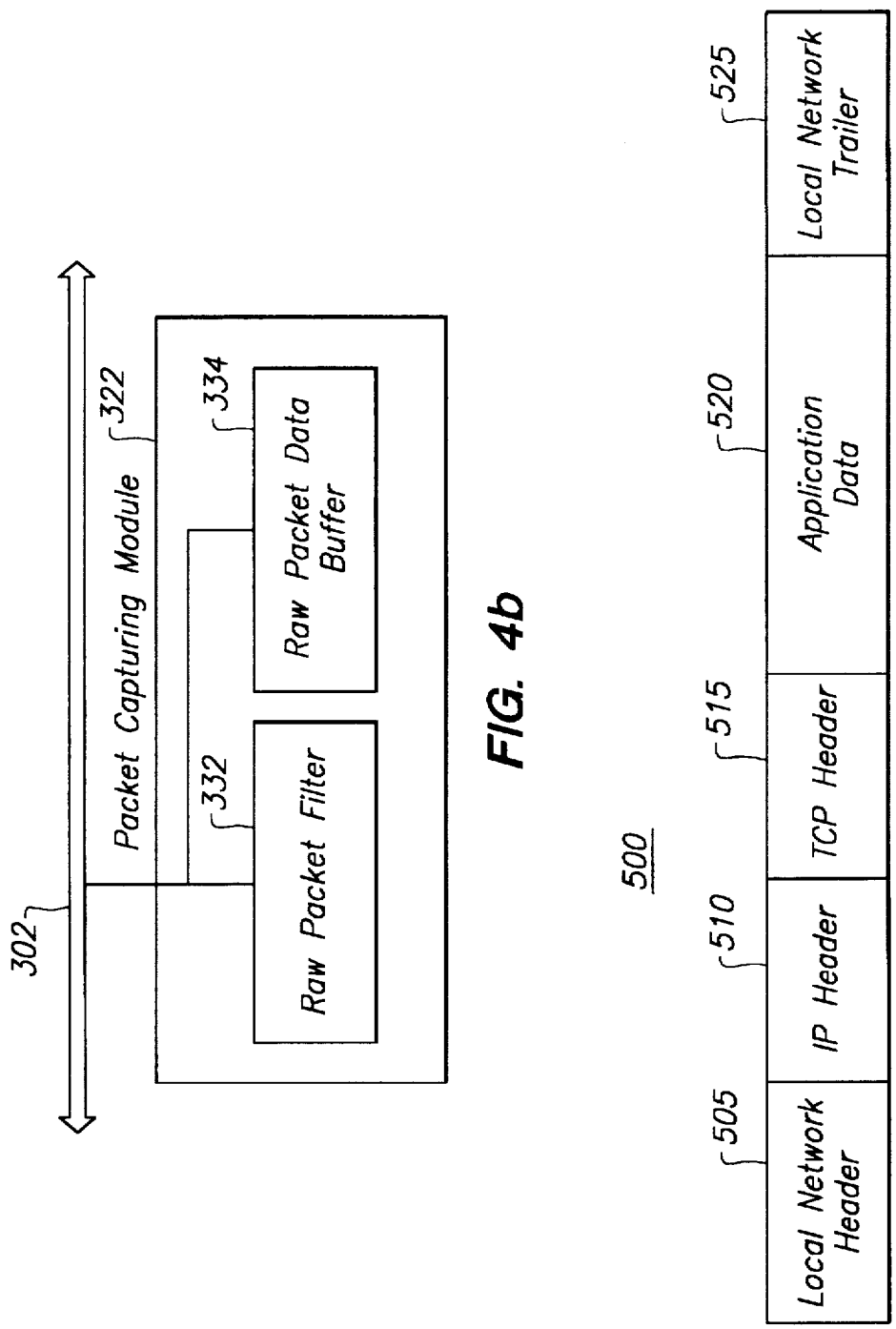

| Packet | Source Physical | Destination Physical | Size | Time-Stamp |
|---|---|---|---|---|
| 1 | 08:00:07:3c:00:46 | 00:00:94:05:d9:00 | 64 | 17:00:17.891000 |
| 2 | 00:00:94:05:d9:00 | 08:00:07:3c:00:46 | 64 | 17:00:17.893000 |
| 3 | 08:00:07:3c:00:46 | 00:00:94:05:d9:00 | 64 | 17:00:17.893000 |
| 4 | 08:00:07:3c:00:46 | 00:00:94:05:d9:00 | 64 | 17:00:18.249000 |
| 5 | 08:00:07:3c:00:46 | 00:00:94:05:d9:00 | 64 | 17:00:18.246000 |
| 6 | 00:00:94:05:d9:00 | 08:00:07:3c:00:46 | 64 | 17:00:18.251000 |
| 7 | 08:00:07:3c:00:46 | 00:00:94:05:d9:00 | 64 | 17:00:18.246000 |
| 8 | 00:00:94:05:d9:00 | 08:00:07:3c:00:46 | 64 | 17:00:18.251000 |
| 9 | 08:00:07:3c:00:46 | 00:00:94:05:d9:00 | 193 | 17:00:18.253000 |
| 10 | 00:00:94:05:d9:00 | 08:00:07:3c:00:46 | 64 | 17:00:18.254000 |
| 11 | 08:00:07:3c:00:46 | 00:00:94:05:d9:00 | 64 | 17:00:18.255000 |
| 12 | 00:00:94:05:d9:00 | 08:00:07:3c:00:46 | 64 | 17:00:18.257000 |
| 13 | 00:00:94:05:d9:00 | 08:00:07:3c:00:46 | 1518 | 17:00:18.719000 |
| 14 | 08:00:07:3c:00:46 | 00:00:94:05:d9:00 | 64 | 17:00:18.774000 |
| 15 | 00:00:94:05:d9:00 | 08:00:07:3c:00:46 | 435 | 17:00:18.776000 |
| 16 | 08:00:07:3c:00:46 | 00:00:94:05:d9:00 | 64 | 17:00:18.835000 |
| 17 | 00:00:94:05:d9:00 | 08:00:07:3c:00:46 | 64 | 17:00:18.863000 |
| 18 | 08:00:07:3c:00:46 | 00:00:94:05:d9:00 | 64 | 17:00:19.398000 |
| 19 | 08:00:07:3c:00:46 | 00:00:94:05:d9:00 | 64 | 17:00:21.255000 |
| 20 | 00:00:94:05:d9:00 | 08:00:07:3c:00:46 | 64 | 17:00:21.257000 |
| 21 | 08:00:07:3c:00:46 | 00:00:94:05:d9:00 | 64 | 17:00:21.611000 |
| 22 | 00:00:94:05:d9:00 | 08:00:07:3c:00:46 | 64 | 17:00:21.613000 |
| 23 | 08:00:07:3c:00:46 | 00:00:94:05:d9:00 | 64 | 17:00:21.614000 |
| 24 | 08:00:07:3c:00:46 | 00:00:94:05:d9:00 | 64 | 17:00:21.617000 |
| 25 | 00:00:94:05:d9:00 | 08:00:07:3c:00:46 | 64 | 17:00:21.619000 |
| 26 | 08:00:07:3c:00:46 | 00:00:94:05:d9:00 | 64 | 17:00:21.619000 |
| 27 | 08:00:07:3c:00:46 | 00:00:94:05:d9:00 | 64 | 17:00:22.433000 |
| 28 | 00:00:94:05:d9:00 | 08:00:07:3c:00:46 | 64 | 17:00:22.435000 |
| 29 | 08:00:07:3c:00:46 | 00:00:94:05:d9:00 | 76 | 17:00:22.436000 |
| 30 | 00:00:94:05:d9:00 | 08:00:07:3c:00:46 | 64 | 17:00:22.438000 |

*FIG. 5b-1*

| 31 | 08:00:07:3c:00:46 | 00:00:94:05:d9:00 | 193 | 17:00:22.439000 |
| 32 | 00:00:94:05:d9:00 | 08:00:07:3c:00:46 | 64 | 17:00:22.441000 |
| 33 | 08:00:07:3c:00:46 | 00:00:94:05:d9:00 | 64 | 17:00:22.442000 |
| 34 | 00:00:94:05:d9:00 | 08:00:07:3c:00:46 | 64 | 17:00:22.444000 |
| 35 | 08:00:07:3c:00:46 | 00:00:94:05:d9:00 | 64 | 17:00:22.742000 |
| 36 | 00:00:94:05:d9:00 | 08:00:07:3c:00:46 | 64 | 17:00:22.745000 |
| 37 | 08:00:07:3c:00:46 | 00:00:94:05:d9:00 | 77 | 17:00:22.745000 |
| 38 | 00:00:94:05:d9:00 | 08:00:07:3c:00:46 | 64 | 17:00:22.747000 |
| 39 | 08:00:07:3c:00:46 | 00:00:94:05:d9:00 | 193 | 17:00:22.749000 |
| 40 | 00:00:94:05:d9:00 | 08:00:07:3c:00:46 | 64 | 17:00:22.750000 |
| 41 | 08:00:07:3c:00:46 | 00:00:94:05:d9:00 | 64 | 17:00:22.752000 |
| 42 | 00:00:94:05:d9:00 | 08:00:07:3c:00:46 | 64 | 17:00:22.754000 |
| 43 | 00:00:94:05:d9:00 | 08:00:07:3c:00:46 | 305 | 17:00:22.882000 |
| 44 | 00:00:94:05:d9:00 | 08:00:07:3c:00:46 | 1271 | 17:00:22.992000 |
| 45 | 08:00:07:3c:00:46 | 00:00:94:05:d9:00 | 64 | 17:00:22.936000 |
| 46 | 00:00:94:05:d9:00 | 08:00:07:3c:00:46 | 1069 | 17:00:22.939000 |
| 47 | 08:00:07:3c:00:46 | 00:00:94:05:d9:00 | 64 | 17:00:23.008000 |
| 48 | 00:00:94:05:d9:00 | 08:00:07:3c:00:46 | 64 | 17:00:23.165000 |
| 49 | 00:00:94:05:d9:00 | 08:00:07:3c:00:46 | 302 | 17:00:23.411000 |
| 50 | 00:00:94:05:d9:00 | 08:00:07:3c:00:46 | 1274 | 17:00:23.444000 |
| 51 | 08:00:07:3c:00:46 | 00:00:94:05:d9:00 | 64 | 17:00:23.479000 |
| 52 | 00:00:94:05:d9:00 | 08:00:07:3c:00:46 | 1518 | 17:00:23.483000 |
| 53 | 00:00:94:05:d9:00 | 08:00:07:3c:00:46 | 882 | 17:00:23.484000 |
| 54 | 00:00:94:05:d9:00 | 08:00:07:3c:00:46 | 694 | 17:00:23.540000 |
| 55 | 08:00:07:3c:00:46 | 00:00:94:05:d9:00 | 64 | 17:00:23.551000 |
| 56 | 00:00:94:05:d9:00 | 08:00:07:3c:00:46 | 1518 | 17:00:23.555000 |
| 57 | 00:00:94:05:d9:00 | 08:00:07:3c:00:46 | 1462 | 17:00:23.557000 |
| 58 | 00:00:94:05:d9:00 | 08:00:07:3c:00:46 | 1518 | 17:00:23.601000 |
| 59 | 00:00:94:05:d9:00 | 08:00:07:3c:00:46 | 114 | 17:00:23.601000 |
| 60 | 08:00:07:3c:00:46 | 00:00:94:05:d9:00 | 64 | 17:00:23.613000 |

*FIG. 5b*

| FIG. 5b-1 |
| --- |
| FIG. 5b-2 |

| | |
|---|---|
| 571 — | Packet #9 |
| 572 — | Flags: 0x00<br>Status: 0x00<br>Packet Length:193<br>Timestamp: 17:0018.253000 08/11/1995 |
| 574 — | Ethernet Header<br>Destination: 00:00:94:05:d9:00<br>Source: 08:00:07:3c:00:46<br>Protocol Type:0x0800 IP |
| 576 — | IP Header – Internet Protocol Datagram<br>Version: 4<br>Header Length: 5<br>Precedence: 0<br>Type of Service: %000<br>Unused: %00<br>Total Lenght: 175<br>Identifier: 31479<br>Fragmentation Flags: %000<br>Fragment Offset: 0<br>Time to Live: 60<br>IP Type: 0x06 TCP<br>Header Checksum: 0x897c<br>Source IP Address: 192.216.124.10<br>Dest. IP Address: 192.216.124.26<br>No Internet Datagram Options |
| 578 — | TCP – Transport Control Protocol<br>Source Port: 1842<br>Destination Port: 80 World Wide Web HTTP<br>Sequence Number: 1156874042<br>Ack Number: 1155984753<br>Offset: 5<br>Reserved: %000000<br>Code: %011000<br>    Ack is valid<br>    Push Request<br>Window: 11557<br>Checksum: 0x5ae4<br>Urgent Pointer: 0<br>No TCP Options<br>TCP Data Area:<br>  HTTP/1.0--User- 20 48 54 54 50 2f 31 2e 30 0d 0a 55 73 65 72 2d<br>  Agent: TCPConnec 41 67 65 6e 74 3a 20 54 43 50 43 6f 6e 6e 65 63<br>  tII/2.2 InterCon 74 49 49 2f 32 2e 32 20 49 6e 74 65 72 43 6f 6e<br>  -Web-Library/1.1 2d 57 65 62 2d 4c 69 62 72 61 72 79 2f 31 2e 31<br>  (Macintosh: 68K 20 28 4d 61 63 69 6e 74 6f 73 68 3b 20 36 38 4b<br>  )--Accept: */*-- 29 0d 0a 41 63 63 65 70 74 3a 20 2a 2f 2a 0d 0a<br>  Accept: image/gi 41 63 63 65 70 74 3a 20 69 6d 61 67 65 2f 67 69<br>  f--Accept: image 66 0d 0a 41 63 63 65 70 74 3a 20 69 6d 61 67 65<br>  /jpeg-- 2f 6a 70 65 67 0d 0a<br>Frame Check Sequence: 0x3a256f8e |

| Packet ID | Source Port | Destination Port | Source IP Address | Destination IP Adress |
|---|---|---|---|---|
| 1 | 1842 | 80 | Node 1 | Node 2 |
| 2 | 1827 | 80 | Node 3 | Node 4 |
| 3 | 80 | 1842 | Node 2 | Node 1 |
| 4 | 1969 | 1986 | Node 5 | Node 6 |
| 5 | 80 | 1842 | Node 2 | Node 1 |
| 6 | 80 | 1827 | Node 4 | Node 3 |
| 7 | 80 | 1842 | Node 2 | Node 1 |
| 8 | 1973 | 1997 | Node 7 | Node 8 |
| 10 | 1827 | 80 | Node 3 | Node 4 |
| 11 | 1842 | 80 | Node 1 | Node 2 |

| Packet ID | Source Port | Destination Port | Source IP Address | Destination IP Adress |
|---|---|---|---|---|
| 1 | 1842 | 80 | Node 1 | Node 2 |
| 11 | 1842 | 80 | Node 1 | Node 2 |
| 3 | 80 | 1842 | Node 2 | Node 1 |
| 5 | 80 | 1842 | Node 2 | Node 1 |
| 7 | 80 | 1842 | Node 2 | Node 1 |
| 2 | 1827 | 80 | Node 3 | Node 4 |
| 10 | 1827 | 80 | Node 3 | Node 4 |
| 6 | 80 | 1827 | Node 4 | Node 3 |

| Entry No. | First Node Identification | Second Node Ident. | Data |
|---|---|---|---|
| | 665 | 660 | 665 | 670 |
| 1 | Node 1 | Node 2 | Recompiled Raw Transaction Data |
| 2 | Node 3 | Node 4 | Recompiled Raw Transaction Data |
| N | Node Y | Node Z | Raw Data |

| Entry No. | First Node Identification | Second Node Ident. | Bytes Transferred | Transaction Time (Seconds) | Browser Used |
|---|---|---|---|---|---|
| 1 | Node 1 | Node 2 | 1981 | 3.366 | TCPConnectII |
| 2 | Node 3 | Node 4 | 2148 | 5.081 | Mozilla |
| N | Node Y | Node Z | XXXX | XXXX | XXXX |

| 675 | 670 680 | |
|---|---|---|
| GET/mgr/HTTP/1<br>.0--User-Agent:<br>TCPConnectII/2.2<br>InterCon-Web-Li<br>brary/1.1 (Macin<br>tosh:68K)--Acce<br>pt:\*/\*--Accept:<br>image/gif--Acce<br>pt:image/jpeg-- | 47 45 54 20 2f 6d 67 72 2f 20 48 54 54 50 2f 31<br>2e 30 0d 0a 55 73 65 72 2d 41 67 65 6e 74 3a 20<br>54 43 50 43 6f 6e 6e 65 63 74 49 49 2f 32 2e 32<br>20 49 6e 74 65 72 43 6f 6e 2d 57 65 62 2d 4c 69<br>62 72 61 72 79 2f 31 2e 31 20 28 4d 61 63 69 6e<br>74 6f 73 68 3b 20 36 38 4b 29 0d 0a 41 63 63 65<br>70 74 3a 20 2a 2f 2a 0d 0a 41 63 63 65 70 74 3a<br>20 69 6d 61 67 65 2f 67 69 66 0d 0a 41 63 63 65<br>70 74 3a 20 69 6d 61 67 65 2f 6a 70 65 0d 0d 0a | 685 |
| ⋮ | ⋮ ⋮ ⋮ | |
| HTTP/1.0 200 OK-<br>-Server: WebSTAR<br>--MIME-Version:<br>1.0--Content-typ<br>e: text/html----<br><BODY BACKGROUND<br>="stonewall.jpg"<br>>-<center>--<tit<br>le>Mike Russell'<br>s Home Page</tit<br>le><b>Here you<br>are at Mike Russ<br>ell's home page.<br><BR>-Relax, you'<br>re cool now.<P>-<br>-click below to<br>send me mail:<br<br>>-<A HREF="mailt<br>o:mgr@aggroup.co<br>m">mgr@aggroup.co<br><br>-<img src=<br>"mgr128x128.gif"<br>></a>-</center>-<br><p>Things that<br>are considered b<br>y me to be cool:<br>-    <a href=htt<br>p://www.unitedme<br>dia.com/comics/d<br>ilbert>Dilbert</<br>A>,- <a href=htt<br>p://www.sgi.com/<br>grafica/Graphica<br>  Obscure</A>,-a<br>nd- <a href=http<br>://www.scruz.net<br>/~laz/>Laz's Big<br>  Blue Fish 'n Vi<br>deos</a>. Compa<br>nies that I have | 48 54 54 50 2f 31 2e 30 20 32 30 30 20 4f 4b 0d<br>0a 53 65 72 76 65 72 3a 20 57 65 62 53 54 41 52<br>0d 0a 4d 49 4d 45 2d 56 65 72 73 69 6f 6e 3a 20<br>31 2e 30 0d 0a 43 6f 6e 74 65 6e 74 2d 74 79 70<br>65 3a 20 74 65 78 74 2f 68 74 6d 6c 0d 0a 0d 0a<br>3c 42 4f 44 59 20 42 41 43 4b 47 52 4f 55 4e 44<br>3d 22 73 74 6f 6e 65 77 61 6c 6c 2e 6a 70 67 22<br>3e 0d 3c 63 65 6e 74 65 72 3e 0d 0d 3c 74 69 74<br>6c 65 3e 4d 69 6b 65 20 52 75 73 73 65 6c 6c 27<br>73 20 48 6f 6d 65 20 50 61 67 65 3c 2f 74 69 74<br>6c 65 3e 0d 3c 62 3e 48 65 72 65 20 79 6f 75 20<br>61 72 65 20 61 74 20 4d 69 6b 65 20 52 75 73 73<br>65 6c 6c 27 73 20 68 6f 6d 65 20 70 61 67 65 2e<br>3c 42 52 3e 0d 52 65 6c 61 78 2c 20 79 6f 75 27<br>72 65 20 63 6f 6f 6c 20 6e 6f 77 2e 3c 50 3e 0d<br>0d 43 6c 69 63 6b 20 62 65 6c 6f 77 20 74 6f 20<br>73 65 6e 64 20 6d 65 20 6d 61 69 6c 3a 3c 62 72<br>3e 0d 3c 41 20 48 52 45 46 3d 22 6d 61 69 6c 74<br>6f 3a 6d 67 72 40 61 67 67 72 6f 75 70 2e 63 6f<br>6d 22 3e 6d 67 72 40 61 67 67 72 6f 75 70 2e 63<br>6f 6d 3c 62 72 3e 0d 3c 69 6d 67 20 73 72 63 3d<br>22 6d 67 72 31 32 38 78 31 32 38 2e 67 69 66 22<br>3e 3c 2f 61 3e 0d 3c 2f 63 65 6e 74 65 72 3e 0d<br>3c 70 3e 0d 54 68 69 6e 67 73 20 74 68 61 74 20<br>61 72 65 20 63 6f 6e 73 69 64 65 72 65 64 20 62<br>79 20 6d 65 20 74 6f 20 62 65 20 63 6f 6f 6c 3a<br>0d 20 20 20 20 3c 61 20 68 72 65 66 3d 68 74 74<br>70 3a 2f 2f 77 77 77 2e 75 6e 69 74 65 64 6d 65<br>64 69 61 2e 63 6f 6d 2f 63 6f 6d 69 63 73 2f 64<br>69 6c 62 65 72 74 3e 44 69 6c 62 65 72 74 3c 2f<br>41 3e 2c 0d 20 3c 61 20 68 72 65 66 3d 68 74 74<br>70 3a 2f 2f 77 77 77 2e 73 67 69 2e 63 6f 6d 2f<br>67 72 61 66 69 63 61 2f 3e 47 72 61 66 69 63 61<br>20 4f 62 73 63 75 72 61 3c 2f 41 3e 2c 0d 20 61<br>6e 64 0d 20 3c 61 20 68 72 65 66 3d 68 74 74 70<br>3a 2f 2f 77 77 77 2e 73 63 72 75 7a 2e 6e 65 74<br>2f 7e 6c 61 7a 2f 3e 4c 61 7a 27 73 20 42 69 67<br>20 42 6c 75 65 20 46 69 73 68 20 27 6e 20 56 69<br>64 65 6f 73 3c 2f 61 3e 2e 20 20 43 6f 6d 70 61<br>6e 69 65 73 20 74 68 61 74 20 49 20 68 61 76 65 | 690 |
| ⋮ | ⋮ ⋮ ⋮ | |

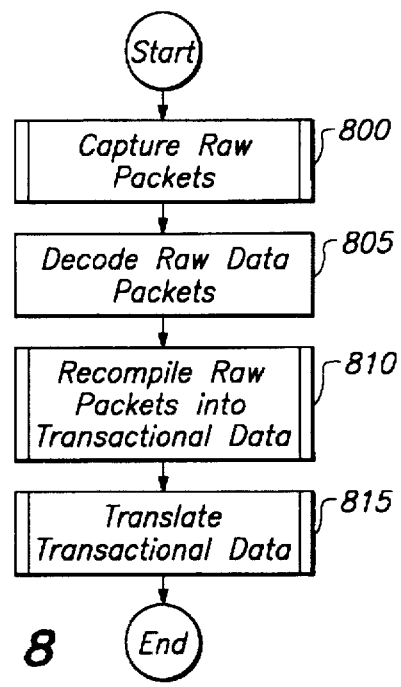
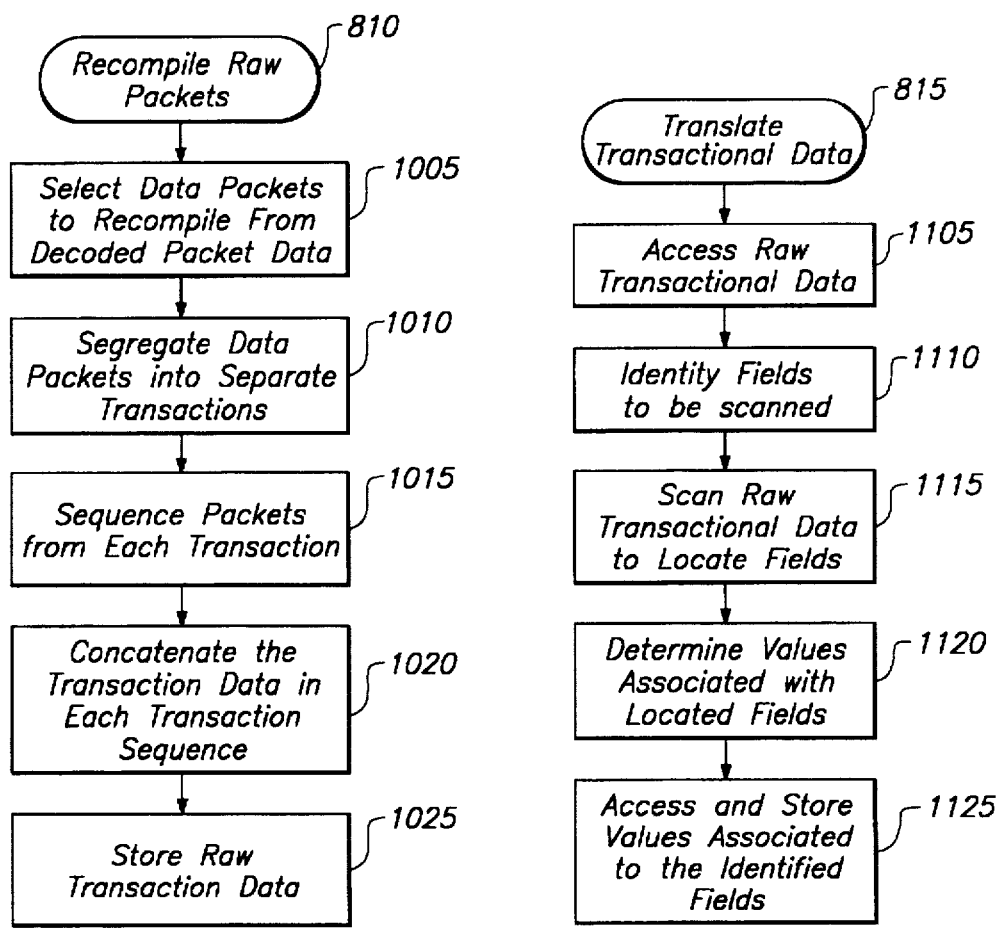
FIG. 8
FIG. 10
FIG. 11

5,787,253

APPARATUS AND METHOD OF ANALYZING INTERNET ACTIVITY

BACKGROUND OF THE INVENTION

1. Field of the Invention

The present invention relates generally to computer networks. More particularly, the present invention relates to an apparatus and method for analyzing internet activity. Still more particularly, the present invention relates to an apparatus and method of monitoring packets to rate Internet usage and monitor Internet performance.

2. Description of the Related Art

An internet may be defined as a collection of networks interconnected, for example, by routers which allow them to function as a single virtual network. For example, the Internet (capital "I") is the largest internet in the world and comprises large backbone nets (such as MILNET and NSFNET) and various regional networks. The popularity of the Internet has made it increasingly important to be able to monitor the use of services offered and rate those services accordingly. For example, objective information such as which Internet services are being used, who is using them, how often they have been accessed, how long accesses have been and what browsers have been used is needed. Additionally, remote access by selected users to generate reports in real time and for access to historical Internet activity data based upon such information is needed. Finally, an Internet activity monitor which can provide alarms to notify selected users of network or site problems is needed.

Conventionally, selected network activities may be retrospectively analyzed by reviewing server log files. Referring now to FIG. 1, a conventional server 10 is shown in communication with a network transmission media 40 such as a twisted pair or coaxial line. A log file 30 is typically recorded in server memory 20 and comprises a set of data concerning server interactions with other network nodes. Log file analyzers must access this data and analyze its contents to determine statistics about the server.

However, while some useful data may be gleaned from server log files, log file analyzers are inadequate for rating network usage and performance for a variety of reasons. First, there is not a universal standard for log file formats. Thus, typical log file analyzers function only for particular servers. Additionally, since log files are independently kept by servers, there is no easy way to organize and track data from multiple servers on one segment or to track the usage of a network by users with no server on the immediate segment. The maintenance of a log file can also impact the performance of the server and, therefore, the network since server resources are consumed by log file processing. As more log file detail is demanded for network activity analysis, an increased drag on server resources such as processing time and storage will be experienced. Additionally, log file analyzer results may be compromised since the data in the log file is under the control of the server administrator and may be edited or altered prior to analyzer access and treatment. Finally, since log files are typically accessed after usage, real time analysis is impractical.

Specialized software server hooks in the form of separate software programs executed by the server may also be used to monitor server activities, but, since these hooks are typically particular to their server and server access is required for their analysis, they suffer the same problems as log file analyzers.

What is needed, therefore, is an internet ratings and performance analyzer which is not reliant upon server resident information such as log files and which, accordingly, allows the user to objectively measure and analyze network activity, customize the type of data that collected and analyzed, undertake real time analysis and receive timely notification of network problems.

SUMMARY OF THE INVENTION

The present invention overcomes the limitations and shortcomings of the prior art with an apparatus and method for analyzing internet activity.

The internet activity analyzer includes a network interface controller, a packet capturing module, a packet analysis module, and a data management module. The network interface controller is connected to a transmission medium for a network segment and is arranged to receive the stream of data packets transmitted over the medium. The packet capturing module is in communication with the network interface controller and filters the packet stream to remove undesired packet data and passes the raw packet data to a raw packet data buffer. The raw packet data is decoded at the internet protocol layer to provide information regarding the packet. This information includes administrative data such as timing and sequencing data regarding the exchange of packets between nodes. After such decoding, a plurality of packets from a plurality of exchanges between a plurality of nodes may be recompiled into proper order using the administrative data to provide concatenated raw transaction data which may be coherently stored in a raw transaction data buffer. For example, a first exchange between first and second nodes and a second exchange between third and fourth nodes may be simultaneously processed by the analyzer. The data in the raw transaction data buffer may be sorted and filtered by the user to organize and eliminate undesired data. An application level protocol translator translates the raw transaction data and stores the data in a translated transaction data buffer. The translated data provides high level information regarding the transactions between nodes which is used to monitor or compile statistics regarding network or internetwork activity. The data management module communicates with the packet capturing module and the packet analyzer and, particularly, the data in the raw packet, decoded packet, raw transaction, and translated transaction data buffers. The data management module includes a logical unit to provide calculated information and an inference analyzer to provide data inferred from the data in the data buffers. The data management module also includes modules for analyzing and stripping the data from the data buffers into smaller portions and indexing the stripped data to further conserve storage space.

By capturing and analyzing data packets transmitted along a network transmission medium between nodes, the internet activity analyzer of the present invention facilitates the analysis of performance based upon reliable data without requiring access to the server. This access is transparent to the network and facilitates reliable data acquisition without draining server resources. Since the analyzer may be separate from the server, the data may be gathered without requiring server input and the opportunity to taint the results of an analysis. The filtering of data may be arranged such that data from selected nodes or protocols may be acquired. Thus, data regarding a site with multiple servers may be accumulated and a comprehensive site analysis may be provided without requiring separate accesses to the various servers which comprise the site. Additionally, a group of users who access the network without passage through a single server may be analyzed, such as, for example, those in a college computer lab.

Timing and sequencing information and ratings data may be provided through analysis of packet and transaction data. Since the analyzer is arranged to acquire packets as they traverse the network media, real time analysis of the information is facilitated. This allows users, whether local or remote, to view network performance and analyze the accesses to selected sites as they occur, and, similarly, facilitates timely notification to users concerning network problems. The provision of applications level decoders facilitates decoding the data packets into high level information and, therefore, allows complex profiles to be developed regarding the transactions between selected nodes.

BRIEF DESCRIPTION OF THE DRAWINGS

FIG. 4b is a block diagram illustrating a preferred embodiment for a packet capturing module for the internet activity analyzer in accordance with the present invention.

FIG. 5a is a lock diagram illustrating a conventional raw packet data profile.

FIG. 5b a block diagram illustrating an exemplary embodiment of a data table derived from data in a raw packet data buffer in accordance with the present invention.

FIG. 5c is a block diagram illustrating an exemplary embodiment of a data table derived from data in a decoded packet data buffer in accordance with the present invention.

FIG. 6a and 6b are lock diagrams illustrating a preferred embodiment of a data table for storing packet information to recompile packet data in accordance with the present invention.

FIG. 6c is a block diagram illustrating a preferred embodiment of a data table in a raw transaction data buffer in accordance with the present invention.

FIG. 6d is a block diagram further illustrating a field in a raw transaction data buffer data table.

FIG. 7 is a block diagram illustrating a preferred embodiment of a data table in a translated transaction data buffer in accordance with the present invention.

FIG. 8 is a flow chart illustrating a preferred embodiment of a method for analyzing internet activity in accordance with the present invention.

FIG. 10 is a flow chart illustrating a preferred embodiment of a method for recompiling raw data packets in accordance with the present invention.

FIG. 11 is a flow chart illustrating a preferred embodiment of a method for translating transactional data in accordance with the present invention.

DESCRIPTION OF THE PREFERRED EMBODIMENTS

Packets are a basic unit of network communication. When a network node communicates with another node on the network or through the network, a number of packets are exchanged between the two nodes. By monitoring the flow of packets over network media, information about the transactions between the nodes may be obtained. In an Internet application, where multiple networks are interconnected, the exchange of information between a first node and a second node may be obtained from packets traversing a network media on a given network segment provided that at least one of the nodes involved in the exchange is on the given segment. The packets traversing network media may be observed and captured by the internet activity analyzer 200, 300 of the present invention without interaction with the two nodes in the transaction.

Figure 1:
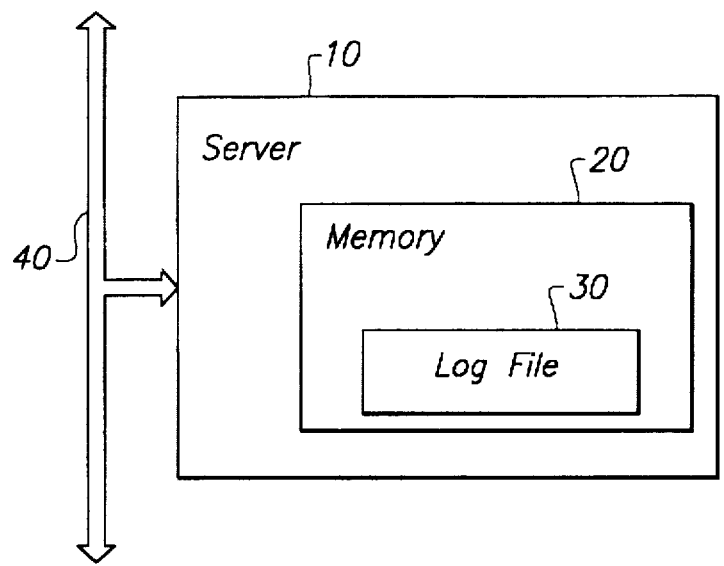
FIG. 1 is a block diagram illustrating a conventional server log file.
Figure 2:
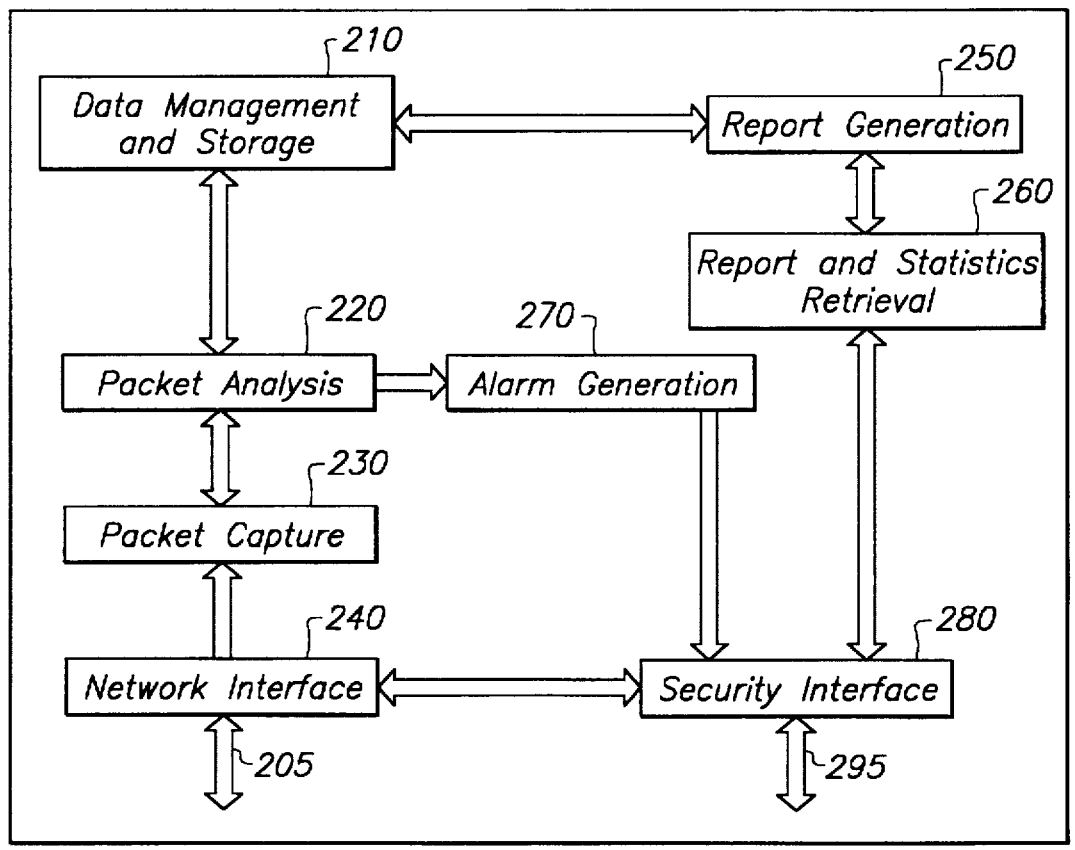
FIG. 2 is a block diagram illustrating the flow of data in a preferred embodiment of the internet activity analyzer in accordance with the present invention.

Referring now to FIG. 2, a block diagram of an overview of the data flow for a preferred embodiment of the internet activity analyzer 200 in accordance with the present invention comprises a network interface 240 which is coupled to a network via a transmission medium 205 such as a twisted pair or coaxial line. The network interface 240 outputs to a packet capture section 230 which is coupled to a packet analysis section 220. The packet analysis section 220 outputs to an alarm generation section 270 and is coupled to a data management and storage section 210. A report generation section 250 is coupled to the data management and storage section 210 and a report and statistics retrieval section 260. A security interface 280 is coupled to the network interface 240, the alarm generation section 270 and the report and statistics retrieval section 260. The security interface may be accessed, for example, by a phone line 295.

Generally, packets comprise a plurality of fields, established by syntax, such as a header portion and a data portion. The information in the packet typically includes information such as the source node address, the destination node address, and data. The internet activity analyzer 200 is coupled to a transmission medium 205 for a network segment through the network interface 240. The network interface is preferably arranged to collect all of the raw packets traversing the network media to which it is attached. The network interface 240 then passes the raw packet data to the packet capture section 230. The packet capture section 230 is arranged to filter out any undesired raw packets and to hold the desired packet data in a buffer for analysis.

A large amount of packets with exchanges between many different nodes may be captured for analysis by the packet analysis section 220. For example, the user may seek to capture and filter raw packets to analyze the exchange of information between five Internet sites and, therefore, all nodes which communicate with them. Preferably, the packet capture section 230 will filter the packets traversing the network medium so as to capture only packets to or from the nodes of interest. The packet data is further decoded and recompiled by the packet analysis section 220 to provide comprehensible data and to allow its review and manipulation. For example, the packet analysis section 220 preferably sorts the packets by nodes in a transaction and uses information provided in the packet to decipher a proper packet exchange sequence.

The packet analysis section 220 receives the buffered packet data and decodes certain information in the packets to provide information such as the sources and destinations of the packets. Many packets are typically exchanged between two nodes to complete a task or transaction.

The packet analysis section 220 also translates the packet data according to applications/presentation layer protocols such as FTP, HTTP, SMTP, TELNET, and others (hereinafter application protocols). This allows the packet analysis section 220 to identify the pieces of protocol information which are used by the nodes in the transaction to instruct them what to do. These actions do not need to be fully simulated. Rather, merely enough information to enable the extraction of pertinent data regarding the instructions and to collect statistical information about them needs to be gathered.

The data management and storage section 210 is coupled to the packet analysis section 220 to access the data compiled and stored therein, to obtain information from the data, and to manage its storage.

A variety of information may be obtained from the raw data, the decoded data, the recompiled data and the translated data. For example, the number, type, sequence and duration of user visits to various locations may be provided. Additionally, inferred information regarding the way that the data is exchanged may be obtained. Preferably, the data management and storage section 210 obtains timing and sequencing information regarding the exchange of data between two nodes for analysis. Additionally, the general level of network utilization required for a transaction is preferably calculated. Detailed information concerning transactions between selected nodes may be obtained by analysis of the decoded data, such as the type of transaction, the type of browser used and the efficiency of the transaction.

The data management and storage section 210 also conserves data storage space by filtering the decoded data to limit it to a desired set and indexing the data to avoid redundant storage of the same data. The data management and storage section 210 also manages the long term storage of the data.

The report generation section 250 provides utilities for configuring the data provided by the data management and storage section 210. Specifically, reports in the forms of graphs, charts, diagrams, or plain text may be provided. This data is provided to a report and statistics retrieval section 260 which allows local access, or remote access through the security interface 280, to the report data.

The increasing use and reliance upon the Internet has also increased the need for reliability. Therefore, it has become important for managers of Internet sites and Internet Service Providers to know immediately of problems or crashes on a network or servers on the network. The alarm generation section 270 accesses data in the packet analysis section 220 provides a rule based system for, inter alia, notification to selected individuals where traffic levels for the entire network media exceeds predetermined thresholds or is below other thresholds. Additionally, the alarm generation section 270 may be configured to monitor traffic over preselected nodes of interest. The alarm generation section provides the data to the selected individuals through the security interface 280, which may be configured accordingly.

Finally, access to the internet activity analyzer 200 may be provided through a security interface 280 to maintain, where necessary, confidentiality. Conventional login procedures may be provided to restrict access and tampering. The collected data may be encrypted as a further barrier to access.

Figure 3:
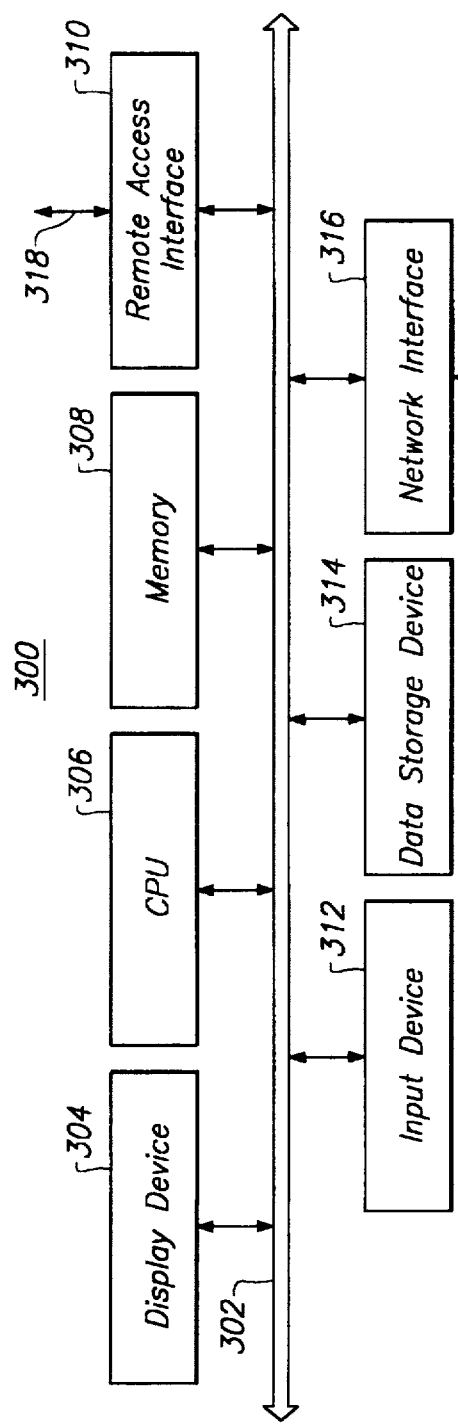
FIG. 3 is a block diagram illustrating a preferred embodiment of the internet activity analyzer constructed in accordance with the present invention.

Referring now to FIG. 3, a block diagram of a preferred embodiment of the internet activity analyzer 300 in accordance with the present invention is shown to comprise a display device 304, a central processing unit (CPU) 306, a memory 308, a remote access interface 310, an input device 312, a data storage device such as a hard disk 314 and a network interface 316. The CPU 306 is connected by a bus 302 to the display device 304, memory 308, remote access interface 310, input device 312, data storage device 314 and network interface 316 in a von Neumann architecture. The CPU 306 is preferably a microprocessor such as a Motorola Power PC series type processor, the display device 304 is preferably a video monitor, the data storage device 314 is preferably a hard disk, and the input device 310 preferably includes a keyboard and mouse. The memory 308 is preferably a random access memory (RAM), but may also be a read only memory (ROM) or a combination of both RAM and ROM. The CPU 306, input device 312, display device 304, data storage device 314 and memory 308 may be arranged to communicate in a conventional manner such as in a personal computer but it is understood that the internet activity analyzer 300 may be, for example, a mainframe computer. It is also understood that the CPU may be other processor types such as a Pentium processor. Alternatively, the local keyboard and mouse for the input device 312 and local display device 304 may be omitted to provide a "black box" type of activity analyzer which may be accessed remotely by those parties with the appropriate access information.

The network interface 316 is coupled to the bus 302, and, via a conventional cable or line 320, to a network transmission medium to connect the internet activity analyzer 300 into a selected network segment. The internet activity analyzer 300 is preferably connected into a segment which includes one or more targeted nodes or services comprising a plurality of nodes. For example, the internet activity analyzer 300 may be connected into the segment in which the world wide web server for netscape.com resides in order to record and report usage statistics regarding the server generally and, for example, for each page on the server. Alternatively, the internet activity analyzer 300 may be connected to a segment that selected users are on in order to monitor their usage of the Internet or to a segment representing part of the Internet backbone in order to monitor its performance and usage. Additionally, a plurality of internet activity analyzers 300 may be connected to network segments to access more comprehensive information. Although the internet activity analyzer 300 is primarily intended for analyzing internet activity, including that on the Internet, is understood that the analyzer 300 may be used to monitor any network, including a local area network (LAN) if desired.

The network interface 316 is preferably a network interface controller (NIC) as manufactured, for example, by National Semiconductor for interface to network media. The receiver portion of the network interface 316 is preferably configured to receive all packets traversing the network segment by using the NIC promiscuous physical capability. In the promiscuous physical mode, the receipt of packets by the network interface 316 is transparent, and, thus, allows packet capture without disturbing the exchange between the source and destination nodes. The packet data captured by the network interface 316 is output to the system bus 302 for processing by the analyzer 300.

The remote access interface 310 is coupled to the bus 302 and to an outside line 318 such as a telephone line to provide alternative access to the analyzer 300. The remote access interface 310 is preferably a modem but may be any means for communicating the data produced by the analyzer 300. The remote access interface 310 may be configured to notify selected parties where predetermined conditions are detected by the analyzer 300. Such notification may be, for example, provided via pager alarms or telephone calls using computer generated voices. Alternatively, the remote access interface 310 may be a network interface connected to a network segment for Internet access to the data provided by the analyzer 300. All data accesses may be secured, encrypted or otherwise limited to selected parties.

The CPU 306, under the instructions received from the memory 308 as configured by the user through the input device 312, provides signals for processing the packets which traverse the network medium 320. For example, the CPU 306, as instructed by the memory 308, may initiate the capture of packets by the network interface 316, store and process the packet data in the memory 308, display selected data locally via the display device 304, store the data for future use in the data storage device 314, or communicate with remote entities through the remote access interface 310.

Figure 4A:
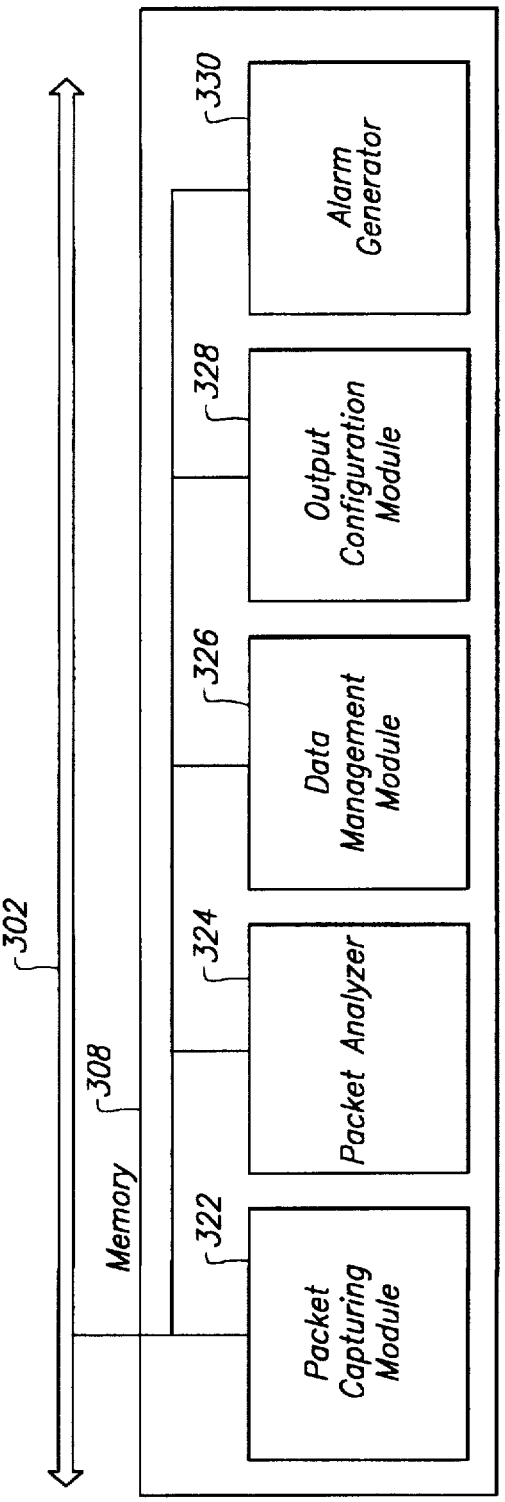
FIG. 4a is a block diagram illustrating a preferred embodiment for a memory of the internet activity analyzer in accordance with the present invention.

Referring now to FIG. 4a, a preferred embodiment of the internet activity analyzer 300 memory 308 is shown in more detail. The memory 308 preferably comprises a packet capturing module 322, a packet analyzer 324, a data management module, a output configuration module 328 and an alarm generator 330. The internet activity analyzer 300 preferably uses a conventional operating system such as Mac OS but the artisan will recognize that a variety of alternative operating systems may be implemented such as Windows or UNIX.

The packet capturing module 322 communicates with the network interface 316 through the system bus 302 and includes routines which capture and hold raw packets of data for processing by the analyzer 300. The packet capturing module 322 is shown and described in more detail with reference to FIG. 4b.

The packet analyzer 324 receives the raw packet data through the system bus 302 and includes routines which decode the raw packet data into coherent information such as that regarding its source and destination, recompiles data from a plurality of packets from exchanges between nodes into raw transaction data and translates the data in the packets at the applications level to identify instructions in the transactions between the nodes. A single exchange between first and second nodes may be captured and analyzed by the packet analyzer 324. However, the packet analyzer 324 is arranged to process a plurality of exchanges between a plurality of nodes. For example, a first transaction including a plurality of exchanged packets between first and second nodes and a second transaction including a plurality of exchanged packets between third and fourth nodes may be simultaneously processed. The packet analyzer 324 is shown and described in more detail with reference to FIG. 4c.

The data management module 326 accesses the information in the raw packet, decoded packet, raw transaction and translated transaction data buffers through the system bus 302 and includes routines for inferring network information about the data such as that related to timing and sequencing, generating information about the data, indexing the information, and managing data storage. The data management module 326 is shown and described in more detail with reference to FIG. 4d.

The output configuration module 328 communicates with the data management module 326, input device 312 and remote access interface 310 and includes routines for configuring data reports from the data management module 326. The data report routines may be conventional programs for the manipulation of data into display formats such as graphs, charts or diagrams and may be customized according to each particular application.

The alarm generator 330 communicates with the data management module 326 and is configured to issue alarms based upon the information contained therein. Preferably, the alarm generator 330 includes threshold information, data defining the scope of interrogation, and data identifying parties to notify in the event of alarm conditions. These values allow the alarm generator 330 to monitor the data in the data management module 326 and to notify identified parties through the remote access interface 310.

Referring now to FIG. 4b, a block diagram of a preferred embodiment of the packet capturing module 322 is shown in more detail to include a raw packet filter 332 and a raw packet data buffer 334. The packet capturing module 322 communicates with the system bus 302 to receive the raw packet data which is output by the network interface 316. Alternatively, raw packet data may be provided to the analyzer 300 by other sources through the remote interface 310. The raw packet data includes all of the packets traversing the network media to which the analyzer 300 is attached. This data can be voluminous, and, where necessary, the raw packet filter 332 is provided to filter the data into a manageable set.

Referring now to FIG. 5a, a block diagram of a simplified conventional raw packet data profile 500 is shown to comprise a local network header 505, an internet protocol (IP) header 510, a transmission control protocol (TCP) header 515, application data 520 and a local network trailer 525. The raw packet filter 332 is in communication with other modules such as the IP packet decoder 336 to facilitate the filtering of packets. The packets may be filtered by a variety of data provided in the packet data profile 500, but, preferably, the raw packet filter 332 is set to output data packets for which selected nodes are the source or destination. This facilitates examination of the exchange of data between the selected nodes and any other nodes, whether the other nodes are selected or not. For example two exchanges between first through fourth nodes may be captured. To facilitate such filtering, the raw packet filter 332, in conjunction with, for example, the IP packet decoder 336, decodes a portion of each packet traversing the network medium to which the analyzer 300 is attached. For example the IP source and destination address portions of the data profile 500 may be determined by the raw packet filter 332 to ascertain the raw packet source and destination addresses. This data may then be compared to predetermined address data stored in memory 308. If the predetermined address data matches, for example, the source or destination address data in the packet, the filter 332 stores the packet in the raw packet data buffer 334.

Preferably, the predetermined data is stored in memory 308 before operation, but comparison data may be provided by the user through the input device 312 or via the remote access interface 310 for real time analysis.

Although filtering raw packets by source or destination address has been described, it is understood that the packet capturing module 322 may be arranged to filter by other criteria such as by the protocol which describes a service such as FTP or HTTP and that the criteria for filtering may be found in the any available field in the raw packet data profile 500. Additionally, the artisan will recognize that the internet activity analyzer 300 may be adapted to treat data transmitted according to protocols other than that shown in FIG. 5a such as the user datagram protocol (UDP) in lieu of TCP.

Referring again to FIG. 4b, the retained raw packets are provided to the raw packet data buffer 334 for access to and further processing by the analyzer 300. The raw packet data buffer 334 is sized according to the level of traffic on the network segment and the expected level of filtering. Preferably, the raw packet data buffer 334 is a data FIFO with sufficient capacity for the expected quantity of data.

Referring now to FIG. 5b, a sample data table 550 derived from data provided in the raw packet data buffer 334 is shown to include packet identity 555, source physical 557, destination physical 559, size 559 and time stamp 561 fields for a plurality of sample entries. Specifically, the table in FIG. 5b shows a list of packets received promiscuously between two locations. The physical source 557 and destination 559 addresses are extracted from the local network header 505 in each packet as is inferred data about the size and time of arrival of the packet. The inferred data may be provided, for example, as described in connection with the data management module 326 below. Such data provides usage and performance information which may be provided to the alarm generator 330.

Figure 4C:
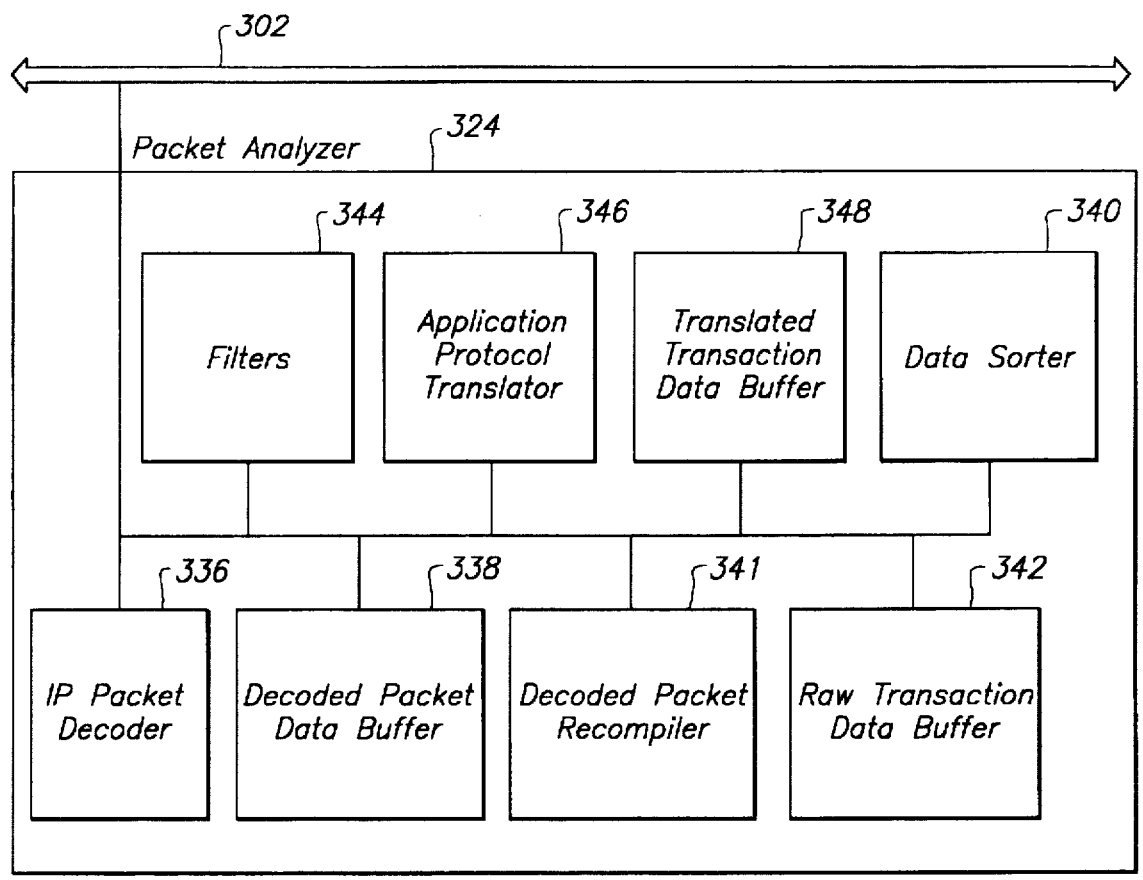
FIG. 4c is a block diagram illustrating a preferred embodiment for a packet analyzer of the internet activity analyzer in accordance with the present invention.

Referring now to FIG. 4c, a block diagram of a preferred embodiment of the packet analyzer 324 is shown in more detail to include a transmission control protocol internet protocol (IP) packet decoder 336, a decoded packet data buffer 338, a data sorter 340, a decoded packet recompiler 341, a raw transaction data buffer 342, a set of filters 344, an application protocol translator 346 and a translated transaction data buffer 348.

Preferably, the packet analyzer 324 communicates with the raw packet data buffer 334 of the packet capturing module 322 to receive raw packets. For example, raw packets may be provided to the IP packet decoder 336 which uses conventional IP (internet protocol) decoding techniques to convert the information in each packet to decoded data such as that provided, for example, in the local network header 505 the IP header 510 and the TCP header 515.

This information includes administrative data for identifying and organizing packet exchanges as well as information identifying the source and destination at various layers. For example, the local network header 505 includes local network source and destination addresses, the IP header 510 includes source and destination internet protocol addresses, which identify the actual nodes communicating with each other, and the TCP header 515 includes source and destination port addresses, sequencing and acknowledgment information and raw (untranslated) application data. The IP packet decoder 336 provides the decoded packets to the decoded packet data buffer 338 for access to and further processing by the analyzer 300.

Referring now to FIG. 5c, an entry 570 for a sample data table 569 derived from data provided in the decoded packet data buffer 338 is shown to include a packet identifying field 571 as well as plural fields for the packet date and time stamp and other information 572, the local network (such as ethernet) header 574, the IP header 576 and the TCP segment 578 which includes a header and raw application data.

The packet analyzer 324 data sorter 340 and filters 344 may be used to further reduce the packet data set according to the fields provided in the decoded packet data buffer 338. For example, if an undesired IP port repeatedly appears in the decoded packet data, the user may, through the input device 312 directly or via the remote access interface 310, remove packets from the decoded packet data buffer 338 which include the IP port as a TCP source or destination. Alternatively, data for sorting, comparison and filtering may be provided beforehand such as in the noted "black box" configuration.

The decoded packet recompiler 341 accesses the decoded packet data buffer 338 to recompile the packets into coherent transaction data. As indicated, a transaction between two nodes typically comprises a plurality of packet exchanges. Since most packets must be acknowledged to ensure transactional integrity, packets are often retransmitted where the lag between the transmission of the packet and its acknowledgment exceeds a predetermined value. Additionally, where packets are improperly received or lost, they may be retransmitted out of sequence with other packets in the transaction. Thus, the set of captured packets for a transaction will often be out of sequence and include duplication. The plural packets are properly sequenced via an analysis of the administrative data included in the packet headers such as the sequencing and acknowledgment information provided in the TCP segment 515, 578. Duplicate packets are discarded after sequencing. Most of the administrative data may then be discarded and the raw application data from the sequential packets may be coherently concatenated.

The decoded packet recompiler 341, in conjunction with the data sorter 340, the filters 344, and data in the decoded packet data buffer 338, is arranged to recompile transactions between plural nodes. Referring now to FIG. 6a, a block diagram of a data table 600 is shown to comprise packet identifier 605, source port identity 610, destination port identity 615, source IP address 612 and destination IP 614 address fields. This data may be accessed from the decoded packet data buffer 338 from fields residing in the IP header 510, 576 and the TCP segment 515, 578. In the example shown in FIG. 6a, exchanges between 8 nodes is shown. Eleven entries for the packet exchanges are shown, but it is understood that many more packet entries may be provided. To recompile the various packets into coherent raw transaction data, the decoded packet recompiler 341 must first separate the packets into conversations between nodes. In this instance, suppose the user wants to analyze data regarding any exchanges in which source port 80 was a participant. The filters 344 may be applied to the data to remove packets which do not include port 80 as either a source or destination. Alternatively, such filtering may be undertaken by the packet capturing module 322 using predetermined data. Thus, in the shown example, the rows corresponding to packet numbers 4 and 8 may be removed from the data table 600. The data in the table 600 may then be sorted to segregate the data into exchanges between selected nodes. First, the data may be sorted by nodes in a transaction and then each transaction may be recompiled into the proper sequence. Preferably, hashing techniques may be used to group the data, but the artisan will recognize alternative techniques.

Referring now to FIG. 6b, the data table 600 is shown to exclude packets from exchanges which do not include the selected ports. Additionally, the entries are segregated according to the packets exchanged between the selected ports. For example, packet entries 1, 11, 3, 5, and 7 comprise the exchange between ports 80 and 1842 (nodes 1 and 2) and packet entries 2, 10 and 6 comprise the exchange between ports 80 and 1827 (nodes 3 and 4). The information in the packet identity fields 605 preferably corresponds to a packet identity field in the decoded packet data buffer 338 so that, after properly segregating the packet exchanges using only the necessary data, the application data fields 520 for the packets may be recompiled in sequence to provide raw transaction data. Additionally, by using corresponding packet identities, other data in the decoded packet data buffer 338 such as the IP source and destination addresses in the IP header 510, 576 may be accessed by the decoded packet recompiler 341 to provide information to the raw transaction data buffer 342.

Referring now to FIG. 6c, a sample data table 650 in the raw transaction data buffer 342 is shown to include entry identification 655, first and second node identification 660, 665 and data 670 fields. The data field 670 includes coherently concatenated data; however, the data remains untranslated. Again, the information in the raw transaction data buffer 342 may be accessed by the packet analyzer 324 data sorter 340 and filters 344 to manipulate the data.

Referring now to FIG. 6d, for illustrative purposes, some entries 685, 690 in a data field 670 in a raw transaction data buffer 342 data table 650 are shown to include a portion of concatenated raw transactional data in text 675 and hex 680.

Referring again to FIG. 4c, the application protocol translator 346 preferably communicates with the raw transaction data buffer 342 to access the recompiled raw transaction data 670. The application protocol translator 346 includes routines for decoding International Organization for Standardization (ISO) application/presentation layer transfers such as electronic mail and file transfers. For example, the application protocol translator 346 may include file transfer protocol (FTP) routines to decode information regarding file transfers between nodes, hypertext transfer protocol (HTTP) routines, or other well known application layer protocols. The instructions defined by the transaction data do not have to be completely simulated to provide relevant information regarding the transaction.

Preferably, to extract pertinent data without unduly consuming resources, lexical stream parsing of the transactional data is undertaken such that keyword and value analysis of the data may be undertaken to extract the relevant data. First, the translator 346 determines what fields to find in the transactional data and, similarly, determines the appropriate keyword for scanning for the field. The selected fields could be provided in memory 308 or may be provided through the input device 312 by the user. Then, the transactional data is scanned by the translator 346 to find the keyword, access the value associated with it, and store that value in the appropriate field of a data table 700 in the translated transaction data buffer 348. For example, suppose the user wanted to scan for the browser used. The HTTP protocol routines, as provided in the application protocol translator 346, recognize that the value following the "User-Agent" keyword includes the appropriate value. Referring to the first entry 685 in the data field 670 of FIG. 6d, the translator would scan through the data, recognize the "User-Agent" keyword, and access the value "TCP InterconnectII" as the value associated with it. The application protocol translator 346 can then provide this information for storage in the translated transaction data buffer 348.

Referring now to FIG. 7, a sample data table 700 in the translated transaction data buffer 348 is shown to include entry identification 705, first and second identification 710, 715, bytes transferred 720, transaction time 725 and browser used 730 fields. Of course, a great number of entries may be provided in the data table to provide additional information.

Figure 4D:
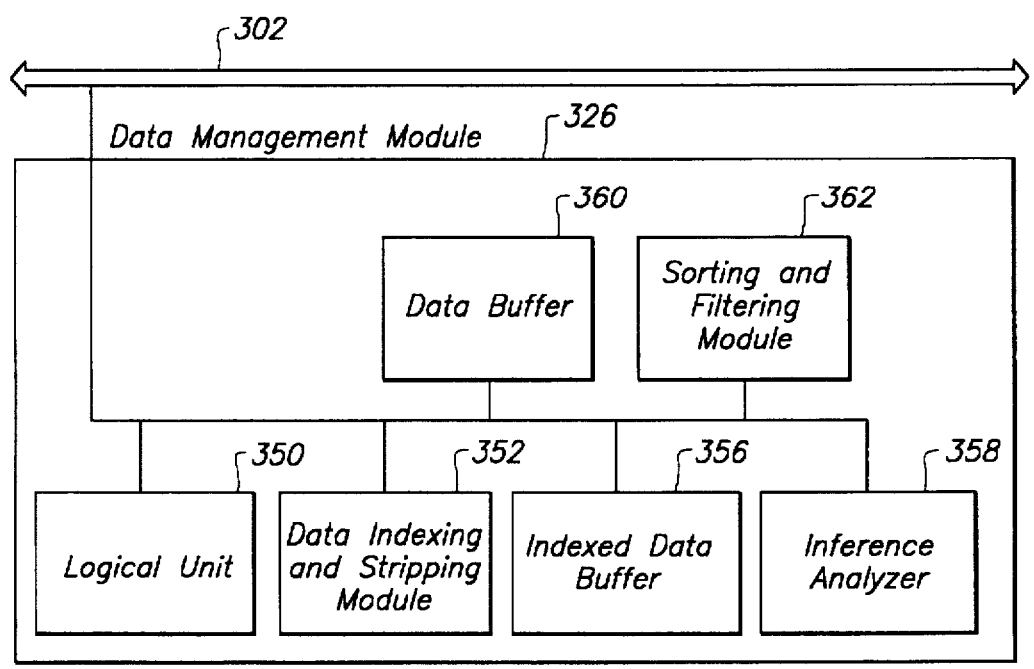
FIG. 4d is a block diagram illustrating a preferred embodiment for a data management module for the internet activity analyzer in accordance with the present invention.

Referring now to FIG. 4d, a block diagram of a preferred embodiment of the data management module 326 is shown in more detail to include a logical unit 350, a data indexing and stripping module 352, an indexed data buffer 356, an inference analyzer 358 a data buffer 360 and a sorting and filtering module 362. The data management module 326 accesses data in the raw packet 334, decoded packet 338, raw transaction 342 and translated transaction 348 data buffers to provide real time, inferred and customized data to the user.

Real time data can be analyzed by accessing the various data buffers 334, 338, 342, 348 directly through the input device 312 or via the remote access interface 310. The observed data may be customized by the data management module 326 and the output configuration module 328.

The logical unit 350 can access timing data in any of the data buffers 334, 338, 342, 348, store it in the data buffer 360, and manipulate it to acquire information about the timing and sequence and related performance of the network, the nodes, or other entities. For example, a bar graph indicating usage of the network media relative to 100% capacity may be observed. To provide such data, data representing the maximum bandwidth capabilities of the network may be stored in memory 308. Typically this data is in the form of a number of bits per second. The number of bits traversing the network medium may be calculated from data provided through the network interface 316 and this number is counted over a given time period. The actual rate is compared to the bandwidth capability data to provide the relative use data. A separate clocking device (not shown) may be provided in the internet activity analyzer 300 where very high accuracy is desired.

Additionally, the data management module 326 may be arranged to rate Internet usage for one or more selected sites. Preferably, to rate such usage, the raw packet filter 332 is arranged to retain only those packets which include the site node address as a source or destination. Alternatively, raw packets could be captured for additional sites and the data could be filtered, after decoding, recompilation, or translation by the packet analyzer filters 344. Thus, the information in the translated transaction data buffer 348 could be limited to entries for exchanges in which the site was a participant. The logical unit 350 can provide a raw count of such entries to rate overall usage or provide more detailed information such as the browsers used to access the site, the average time spent, the average time used for selected transactions, a time to byte transferred ratio. Additionally, information regarding hits and data on individual pages may be provided.

The inference analyzer 358 may also extract inferred data, preferably from the information in the translated transaction data buffer 348. For example, a "GET" command is a command in the HTTP protocol from a browser to a server, so the nodes in a transaction may be identified as such. This allows the data to be segregated accordingly and, likewise, allows the analyzer 300 to focus on browser or server statistics where desired. Additionally, by communicating with the Internet through, for example, the remote access interface 310, information about nodes can be determined. Specifically, suppose a node is generating activity for which inquiry is desired. By transmitting a reverse DNS (Domain Name Service) Query, the IP address field (typically a string of numbers) can be used to provide its Internet address. Thus, an e-mail or other warning could be sent to that user. Additionally, by accessing the IP addresses of the users that visit a site and using the reverse DNS lookup, visitors can be classified in terms of country, commercial, educational, or government. Moreover, using readily available Internet resources, a variety of information beyond the domain name may be ascertained.

Additionally, the data sets may be manipulated for long term storage by the data indexing and stripping module 352 and the indexed data buffer 356. The indexing and stripping module uses indexing algorithms to recognize previously handled quantums of data and instead of repeating storage in memory or the data storage device, the data may be indexed to a common storage area using, for example, a shorthand number which consumes a minimal number of bytes used in place of a longer, frequently replicated piece of data. Additionally, prior to the creation of the index by the module 352, the data may be stripped so that detailed information may be stored, for example, in the form of a shorthand number. The information may be kept in the data management data buffer or provided to the data storage device for long term storage so that Internet activity may be subsequently analyzed.

While the flow of data has been described sequentially in order to clearly indicate how each process is undertaken, it is understood that the processes described regarding the analyzer 300 modules 322, 324, 326, 328, 330 may occur in various sequences on selected data and that the modules 322, 324, 326, 328 and 330 may interact during packet processing. For example, the IP packet decoder 336 may partially decode packets to provide enough information to the packet recompiler 341 to construct concatenated raw transaction data.

Referring now to FIG. 8, a flow chart illustrating a preferred embodiment of a method for analyzing internet activity in accordance with the present invention is shown. Raw packet data may be captured 800 by, for example, connecting the internet activity analyzer 300 to a network transmission medium 205, 320 for a selected network segment. The raw packet data may be limited to a selected data set as determined, for example, by the raw packet filter 332 in the packet capturing module 322. A more detailed method of packet capture 800 is shown and described regarding FIG. 9 below.

The captured raw packets are then decoded 805 to provide information regarding the exchange of packets between nodes through the transmission medium 205, 320. The captured raw packets may be decoded, for example, in the IP packet decoder 336 of the packet analyzer 324. The raw packet data input to the IP packet decoder 336 is decoded 805 to provide information such as administrative data regarding the timing and sequence of the packets exchanged between nodes. The decoded data also includes information such as the IP source and destination addresses of the nodes in the exchange as well as the TCP port addresses involved in the packet exchange.

After decoding 805, the data may be recompiled 810 into raw transactional data. The packets may be recompiled, for example, in the decoded packet recompiler 341 of the packet analyzer 324. A transaction between two nodes typically involves a plurality of packet exchanges between those nodes which may be presented out of sequence or in duplicate. By accessing the administrative timing and sequencing data in the decoded packets, the packets are reassembled into a proper sequence and the duplicates are stripped from the data set. Recompilation 810 produces a concatenated stream of raw application data which may be stored for further processing. A more detailed method of packet recompilation 810 where plural transactions are analyzed is shown and described regarding FIG. 10 below.

After recompilation 810, the data may be translated 815 at the application level to provide information such as the number of bytes transferred, the type of CPU and browser used, and other information regarding the transaction. The raw transactional data may be translated 815, for example, in the application protocol translator 346 in the packet analyzer 324. A more detailed method of transactional data translation 815 is shown and described regarding FIG. 11 below.

It is understood that FIG. 8 discloses the flow and status of data at various stages in its processing by the internet activity analyzer 200, 300 and that the data set, in partial or in whole, may be accessed, manipulated, used to generate information or otherwise processed at such stages.

Figure 9:
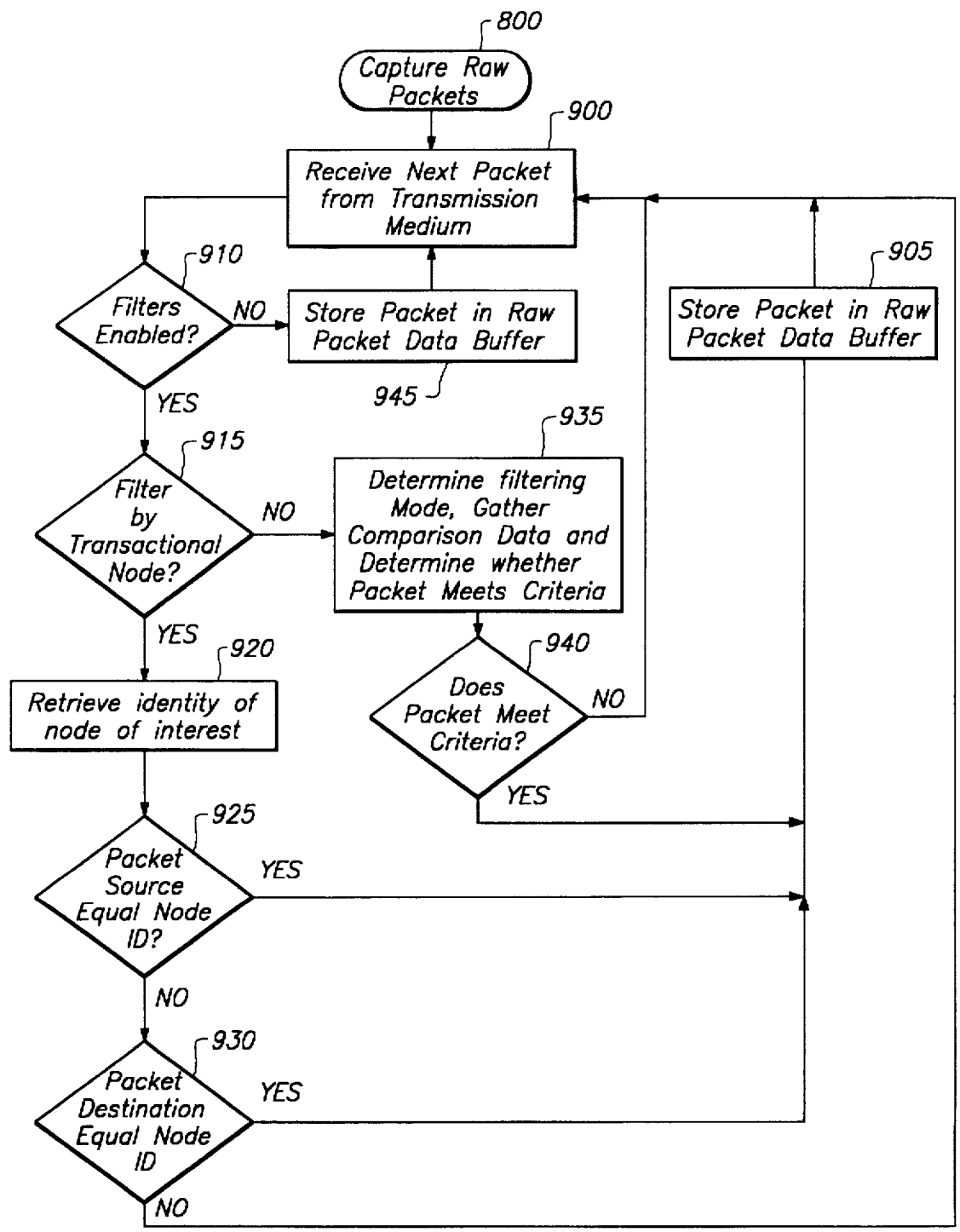
FIG. 9 is a flow chart illustrating a preferred embodiment of a method for capturing raw pack data in accordance with the present invention.

Referring now to FIG. 9, a flow chart illustrating a preferred method of capturing 800 raw packets is shown. The next packet passing through the network transmission medium 320 is received 900, for example, by the network interface 316 of the internet activity analyzer 300. Initially, it is determined 910 whether any raw packet filters are enabled and, if none are, the raw packet is stored 945 in the raw packet data buffer 334 of the packet capturing module 322. If any filters are enabled, the type of filtering desired is ascertained. If it is determined 915 that transactional node filtering is enabled, then the identity of the node or nodes of interest is retrieved 920, for example, from memory 308 for comparison to the data in the packet to determine whether to store it in the buffer. First, the node identity data is compared to the source node data in the packet, and, upon a positive comparison, the packet is stored 905 in the raw packet data buffer 334 and the next packet from the transmission medium is received 900. If the packet source is not equal to the node identity data, then the packet destination data is compared 930 to the node identity data. Similarly, where a match is found, the packet is stored 905 in the packet data buffer and then the next packet traversing the network transmission medium is sought 900. If a match is not found in this comparison 930, the packet is discarded since neither its source nor destination equals the node identity data. If transactional node filtering is not sought, then alternative filtering modes may be implemented 935. For example, the raw packets may be filtered by protocol such as HTTP, FTP, SMTP if packets concerning such exchanges are sought. Similarly to transactional node filtering, the filtering mode is determined, the comparison data is accessed and stored in memory 308 and the information in the packet is compared to such data to determine whether to store 905 the packet in the raw packet data buffer 334 or proceed to receive 900 the next packet. It is understood that filtering according to multiple fields may also be undertaken. For example, all of the HTTP protocol exchanges between IP addresses 1, 2, 3, 4 and 5 may be sought.

Referring now to FIG. 10, a now chart illustrating a preferred method of recompiling 810 raw packets is shown. The decoded packet data is accessed, preferably in the decoded packet data buffer 338, and, after optionally sorting 340 and filtering 344 the data, a set of data packets are selected 1005 for recompilation. Several transactions from many nodes may be presented in the set of packets. For example, a first transaction between first and second nodes and a second transaction between third and fourth nodes may be presented. The set of packet data is segregated 1010 into separate transactions by the decoded packet recompiler 341 by sorting the data, using the data sorter 340, by nodes in a transaction. Thereafter, the packets from each transaction are arranged in a coherent sequence 1015 by the recompiler 341, as indicated, through analysis of the administrative and other data in the decoded packets. If necessary, duplicate packets may be deleted from the sequence. The raw transactional data from the data packets is therefore properly arranged so that the raw data may be concatenated 1020 into a coherent stream for storage 1025, for example, in the raw transaction data buffer 342.

Referring now to FIG. 11, the information from the raw transaction data buffer 342 is then translated 815 into more meaningful data. First the raw transactional data is accessed 1105 by the application protocol translator 346 for processing. The application protocol translator 346 includes application level protocols such as FTP, HTTP and SMTP so that the concatenated data may be translated. The transaction between the two nodes does not need to be fully simulated. Pertinent data may effectively be extracted using keyword and value searching as described regarding the operation of the application protocol translator 346. First the fields to be scanned are identified 1110. The protocol translator 346 converts these fields to keyword data particular to each application layer protocol. Then, the raw transactional data is scanned 1115 by keyword to locate the fields. The values associated with those fields are determined 1120, accessed and stored 1125 for example, in a data table 700 in the translated transaction data buffer 348 for further processing.

While the present invention has been described with reference to certain preferred embodiments, those skilled in the art will recognize that various modification may be provided. For example, the raw packet 334, decoded packet 338, raw transaction 342, translated transaction 348 and other 360 data buffers may be provided in a centralized database. These and other variations upon and modifications to the preferred embodiment are provided for by the present invention which is limited only by the following claims.

We claim:

1. An apparatus for analyzing internet activity, the apparatus comprising:
   a packet capturing module, for accessing the packets traversing a network, the packets having source and destination addresses other than an address corresponding to the apparatus, and for filtering the packets to produce raw packet data, wherein the packet capturing module produces the raw packet data by retrieving a predetermined address, comparing the predetermined address to the internet protocol source address for a current packet, comparing the predetermined address to the internet protocol destination address for the current packet, and retaining the current packet where one of the internet protocol source and destination addresses for the current packet matches the predetermined address;
   a packet analyzing module, in communication with the packet capturing module, for producing decoded packet data and for producing transaction data from the decoded packet data; and
   a data management module, in communication with the packet capturing module and the packet analyzing module, for analyzing at least one of the raw packet data, the decoded packet data and the transaction data to provide an indication of internet usage.

2. An apparatus for analyzing internet activity, the apparatus comprising:
   a packet capturing module, for accessing the packets traversing a network, the packets having source and destination addresses other than an address corresponding to the apparatus, and for filtering the packets to produce raw packet data, wherein the packet capturing module produces the raw packet data by retrieving a predetermined port address, comparing the predetermined port address to the transmission control protocol source port address for a current packet, comparing the predetermined port address to the transmission control protocol destination port address for the current packet, and retaining the current packet where one of the transmission control protocol source and destination port addresses for the current packet matches the predetermined port address;
   a packet analyzing module, in communication with the packet capturing module, for producing decoded packet data and for producing transaction data from the decoded packet data; and
   a data management module, in communication with the packet capturing module and the packet analyzing module, for analyzing at least one of the raw packet data, the decoded packet data and the transaction data to provide an indication of internet usage.

3. An apparatus for analyzing internet activity, the apparatus comprising:
   a packet capturing module, for accessing the packets traversing a network, the packets having source and destination addresses other than an address corresponding to the apparatus, and for filtering the packets to produce raw packet data;
   a packet analyzing module, in communication with the packet capturing module, for producing decoded packet data and for producing transaction data from the decoded packet data, the packet analyzing module comprising:
      a packet decoder, for accessing the raw packet data and producing the decoded packet data; and
      a decoded packet recompiler, in communication with the packet decoder, for accessing the decoded packet data, segregating the packets from the decoded packet data into separate transactions between nodes, sequencing the packets corresponding to each separate transaction, and concatenating the data in each separate transaction to produce the transaction data; and
   a data management module, in communication with the packet capturing module and the packet analyzing module, for analyzing at least one of the raw packet data, the decoded packet data and the transaction data to provide an indication of internet usage.

4. The apparatus of claim 3, wherein the transaction data includes a first transaction and a second transaction, the first transaction comprising packets exchanged between a first node and a second node and the second transaction comprising packets exchanged between a third node and a fourth node.

5. An apparatus for analyzing internet activity, the apparatus comprising:
   a packet capturing module, for accessing the packets traversing a network, the packets having source and destination addresses other than an address corresponding to the apparatus, and for filtering the packets to produce raw packet data;
   a packet analyzing module, in communication with the packet capturing module, for producing decoded packet data, for producing transaction data from the decoded packet data, and for producing translated transaction data from the transaction data, the packet analyzing module comprising:
      a packet decoder, for accessing the raw packet data and producing the decoded packet data;
      a decoded packet recompiler, in communication with the packet decoder, for accessing the decoded packet data, segregating the packets from the decoded packet data into separate transactions between nodes, sequencing the packets corresponding to each separate transaction, and concatenating the data in each separate transaction to produce the transaction data; and
      an application protocol translator, in communication with the decoded packet recompiler, for producing the translated transaction data by accessing the transaction data, scanning the transaction data for a field corresponding to a selected application protocol, determining a value associated with the field, and storing the field and the associated value; and a data management module, in communication with the packet capturing module and the packet analyzing module, for analyzing at least one of the raw packet data, the decoded packet data, the transaction data, and the translated transaction data to provide an indication of internet usage.

6. The apparatus of claim 5, wherein the transaction data includes a first transaction and a second transaction, the first transaction comprising packets exchanged between a first node and a second node and the second transaction comprising packets exchanged between a third node and a fourth node.

7. The apparatus of claim 5, wherein the data management module produces a profile of a selected site by determining the number of transactions in which the selected site participates.

8. The apparatus of claim 7, wherein the data management module produces analytical data corresponding to selected transactions that the selected site participates in, the analytical data for each selected transaction including at least one of the browser type used to access the selected site, the amount of data transferred in the transaction, and the transaction time.

9. The apparatus of claim 7, wherein the data management module accesses the addresses for nodes transacting with the selected site, uses a reverse domain name service lookup to obtain information about the nodes, and uses the information about the nodes to produce the profile of the selected site.

10. For use with an internet activity analyzer capable of being coupled to a network transmission medium, a method of analyzing internet activity, the method comprising:

accessing the packets traversing the network, the packets having source and destination addresses other than an address corresponding to the internet activity analyzer;

filtering the packets to produce raw packet data by retrieving a predetermined address; comparing the predetermined address to the internet protocol source address for a current packet; comparing the predetermined address to the internet protocol destination address for the current packet; and retaining the current packet where one of the internet protocol source and destination addresses for the current packet matches the predetermined address;

producing decoded packet data;

producing transaction data from the decoded packet data; and analyzing at least one of the raw packet data, the decoded packet data and the transaction data to provide an indication of internet usage.

11. For use with an internet activity analyzer capable of being coupled to a network transmission medium, a method of analyzing internet activity, the method comprising:

accessing the packets traversing the network, the packets having source and destination addresses other than an address corresponding to the internet activity analyzer;

filtering the packets to produce raw packet data by retrieving a predetermined port address; comparing the predetermined port address to the transmission control protocol source port address for a current packet; comparing the predetermined port address to the transmission control protocol destination port address for the current packet; and retaining the current packet where one of the transmission control protocol source and destination port addresses for the current packet matches the predetermined port address;

producing decoded packet data;

producing transaction data from the decoded packet data; and analyzing at least one of the raw packet data, the decoded packet data and the transaction data to provide an indication of internet usage.

12. For use with an internet activity analyzer capable of being coupled to a network transmission medium, a method of analyzing internet activity, the method comprising:

accessing the packets traversing the network, the packets having source and destination addresses other than an address corresponding to the internet activity analyzer;

filtering the packets to produce raw packet data;

producing decoded packet data;

producing transaction data from the decoded packet data by accessing the decoded packet data; segregating the packets from the decoded packet data into separate transactions between nodes; sequencing the packets corresponding to each separate transaction; and concatenating the data in each separate transaction to produce the transaction data; and analyzing at least one of the raw packet data, the decoded packet data and the transaction data to provide an indication of internet usage.

13. The method of claim 12, wherein the transaction data includes a first transaction and a second transaction, the first transaction comprising packets exchanged between a first node and a second node and the second transaction comprising packets exchanged between a third node and a fourth node.

14. For use with an internet activity analyzer capable of being coupled to a network transmission medium, a method of analyzing internet activity, the method comprising:

accessing the packets traversing the network, the packets having source and destination addresses other than an address corresponding to the internet activity analyzer;

filtering the packets to produce raw packet data;

producing decoded packet data;

producing transaction data from the decoded packet data by accessing the decoded packet data; segregating the packets from the decoded packet data into separate transactions between nodes; sequencing the packets corresponding to each separate transaction; and concatenating the data in each separate transaction to produce the transaction data; and producing translated transaction data from the transaction data; and analyzing at least one of the raw packet data, the decoded packet data, the transaction data, and the translated transaction data to provide an indication of internet usage.

15. The method of claim 14, wherein the step of producing translated transaction data comprises:

accessing the transaction data;

scanning the transaction data for a field corresponding to a selected application protocol;

determining a value associated with the field; and retaining an association between the field and the determined value.

16. The method of claim 15, wherein the transaction data includes a first transaction and a second transaction, the first transaction comprising packets exchanged between a first node and a second node and the second transaction comprising packets exchanged between a third node and a fourth node.

17. The method of claim 16, further comprising:
producing a profile of a selected site by determining the number of transactions in which the selected site participates.

18. The method of claim 17, wherein analytical data corresponding to selected transactions that the selected site participates in is produced, the analytical data for each selected transaction including at least one of: the browser type used to access the selected site, the amount of data transferred in the transaction, and the transaction time.

19. The method of claim 17, further comprising:
accessing the addresses for nodes transacting with the selected site;
using a reverse domain name service lookup to obtain information about the nodes; and
using the information about the nodes to produce the profile of the selected site.

20. An apparatus for analyzing internet activity, the apparatus comprising:
means for accessing the packets traversing the network, the packets having source and destination addresses other than an address corresponding to the internet activity analyzer;
means for filtering the packets to produce raw packet data, wherein the means for filtering the packets to produce raw packet data includes routines for retrieving a predetermined address; comparing the predetermined address to the internet protocol source address for a current packet; comparing the predetermined address to the internet protocol destination address for the current packet; and retaining the current packet where one of the internet protocol source and destination addresses for the current packet matches the predetermined address ;
means for producing decoded packet data;
means for producing transaction data from the decoded packet data; and
means for analyzing at least one of the raw packet data, the decoded packet data and the transaction data to provide an indication of internet usage.

21. An apparatus for analyzing internet activity, the apparatus comprising:
means for accessing the packets traversing the network, the packets having source and destination addresses other than an address corresponding to the internet activity analyzer;
means for filtering the packets to produce raw packet data, wherein the means for filtering the packets to produce raw packet data includes routines for retrieving a predetermined port address; comparing the predetermined port address to the transmission control protocol source port address for a current packet; comparing the predetermined port address to the transmission control protocol destination port address for the current packet; and retaining the current packet where one of the transmission control protocol source and destination port addresses for the current packet matches the predetermined port address;
means for producing decoded packet data;
means for producing transaction data from the decoded packet data; and
means for analyzing at least one of the raw packet data, the decoded packet data and the transaction data to provide an indication of internet usage.

22. An apparatus for analyzing internet activity, the apparatus comprising:
means for accessing the packets traversing the network, the packets having source and destination addresses other than an address corresponding to the internet activity analyzer;
means for filtering the packets to produce raw packet data;
means for producing decoded packet data;
means for producing transaction data from the decoded packet data, wherein the means for producing transaction data includes routines for accessing the decoded packet data; segregating the packets from the decoded packet data into separate transactions between nodes; sequencing the packets corresponding to each separate transaction; and concatenating the data in each separate transaction to produce the transaction data; and
means for analyzing at least one of the raw packet data, the decoded packet data and the transaction data to provide an indication of internet usage.

23. The apparatus of claim 22, wherein the transaction data includes a first transaction and a second transaction, the first transaction comprising packets exchanged between a first node and a second node and the second transaction comprising packets exchanged between a third node and a fourth node.

* * * * *